United States Patent
Diorio

(10) Patent No.: US 9,330,284 B1
(45) Date of Patent: May 3, 2016

(54) BROADCAST REFRESH OF RFID TAG PERSISTENCE

(75) Inventor: Christopher J. Diorio, Shoreline, WA (US)

(73) Assignee: IMPINJ, INC., Seattle, WA (US)

( * ) Notice: Subject to any disclaimer, the term of this patent is extended or adjusted under 35 U.S.C. 154(b) by 1120 days.

(21) Appl. No.: 13/271,937

(22) Filed: Oct. 12, 2011

Related U.S. Application Data

(60) Provisional application No. 61/476,527, filed on Apr. 18, 2011.

(51) Int. Cl.
G06K 7/00 (2006.01)
G06K 7/10 (2006.01)
G06Q 10/08 (2012.01)

(52) U.S. Cl.
CPC .......... *G06K 7/0008* (2013.01); *G06K 7/10039* (2013.01); *G06Q 10/087* (2013.01)

(58) Field of Classification Search
CPC ............ G06K 7/0008; G06K 7/10039; G06K 7/10019; G06K 19/0723; G06Q 10/087; G06Q 10/0875; H04Q 2209/75; H04Q 9/00
See application file for complete search history.

(56) References Cited

U.S. PATENT DOCUMENTS

| | | | | |
|---|---|---|---|---|
| 6,952,157 B1 * | 10/2005 | Stewart et al. | ............... | 340/10.2 |
| 8,410,906 B1 * | 4/2013 | Dacus et al. | ................. | 340/10.1 |
| 2005/0099269 A1 * | 5/2005 | Diorio et al. | ............... | 340/10.51 |
| 2005/0263591 A1 * | 12/2005 | Smith | ............................ | 235/385 |
| 2007/0069863 A1 * | 3/2007 | Akiyama et al. | ............. | 340/10.2 |
| 2007/0176751 A1 * | 8/2007 | Cesar et al. | ................. | 340/10.32 |
| 2007/0229230 A1 * | 10/2007 | Drago et al. | ................ | 340/10.52 |
| 2008/0018431 A1 * | 1/2008 | Turner et al. | ................. | 340/10.2 |
| 2009/0021353 A1 * | 1/2009 | Nonaka | ........................ | 340/10.2 |
| 2009/0237218 A1 * | 9/2009 | Kim | ............................ | 340/10.3 |
| 2010/0060425 A1 * | 3/2010 | Rodriguez et al. | ........... | 340/10.1 |
| 2010/0060432 A1 * | 3/2010 | van Niekerk et al. | ........ | 340/10.3 |
| 2010/0156613 A1 * | 6/2010 | Hirata et al. | ............... | 340/10.42 |

OTHER PUBLICATIONS

Finkenzeller: "RFID Handbook: Fundamentals and Applications in Contactless Smart Cards and Identification", pp. 309-317, 2003.*

* cited by examiner

*Primary Examiner* — Firmin Backer
*Assistant Examiner* — Nay Tun
(74) *Attorney, Agent, or Firm* — Turk IP Law, LLC

(57) ABSTRACT

A reader may broadcast a refresh command to a population or subpopulation of tags and thereby refresh and extend the persistence time of a tag flag, such as an inventoried flag. The characteristics, timing, and other details of this broadcast refresh command may be determined based on the state of a reader, environmental, tag-population, and/or tag-capability conditions and parameters. The refresh command may be a Select command of the Gen2 Specification, in which case parameters of the Select command specify the refresh operation.

20 Claims, 10 Drawing Sheets

| | | | | Mask | | | |
|---|---|---|---|---|---|---|---|
| | Membank | Pointer | Length | FEF | | | FCF |
| | | | | Class ID | MDID | Indicator | Command code | Data |
| # of bits | 2 | EBV | 8 | 2 | 12 | 1 | 5 | Variable |
| description | 10 | 06$_h$ | 14$_h$ | 10 | 000000000001 | 1 | 00000 | – |

EXAMPLE

*RFID READER CONFIGURATION WITH OPTIONAL LOCAL AND REMOTE COMPONENTS*

| Flag | Required persistence |
|---|---|
| S0 inventoried flag | Tag energized: Indefinite<br>Tag not energized: None |
| S1 inventoried flag[1] | Tag energized:<br>  Nominal temperature range: 500ms < persistence < 5s<br>  Extended temperature range: Not specified<br>Tag not energized:<br>  Nominal temperature range: 500ms < persistence < 5s<br>  Extended temperature range: Not specified |
| S2 inventoried flag[1] | Tag energized: Indefinite<br>Tag not energized:<br>  Nominal temperature range: 2s < persistence<br>  Extended temperature range: Not specified |
| S3 inventoried flag[1] | Tag energized: Indefinite<br>Tag not energized:<br>  Nominal temperature range: 2s < persistence<br>  Extended temperature range: Not specified |
| Selected (SL) flag[1] | Tag energized: Indefinite<br>Tag not energized:<br>  Nominal temperature range: 2s < persistence<br>  Extended temperature range: Not specified |

| ITEM | COMMAND | TARGET | ACTION | MEMBANK | POINTER | LENGTH | MASK | TRUNCATE | CRC-16 |
|---|---|---|---|---|---|---|---|---|---|
| # OF BITS | 4 | 3 | 3 | 2 | EBV | 8 | VARIABLE | 1 | 16 |
| DESCR. | 1010 | 000: Inventoried (S0)<br>001: Inventoried (S1)<br>010: Inventoried (S2)<br>011: Inventoried (S3)<br>100: SL<br>101: RFU<br>110: RFU<br>111: RFU | See Table 6.18 | 00: RFU<br>01: EPC<br>10: TID<br>11: User | Starting Mask address | Mask length (bits) | Mask value | 0: Disable truncation<br>1: Enable truncation | |

*TABLE 6.17 – SELECT COMMAND OF THE GEN2 SPEC VERSION 1.1.0*

FIG. 11A

| | Membank | Pointer | Length | Mask | | | | | |
|---|---|---|---|---|---|---|---|---|---|
| | | | | Subfield_1 | FEF | | | FCF | |
| | | | | | Subfield_N | ... | Command code | Data |
| # of bits | 2 | EBV | 8 | Variable | Variable | Variable | 5 | Variable |
| description | – | – | – | – | – | – | – | – |

*SUBDIVIDING THE MASK FIELD*

FIG. 11B

| | Membank | Pointer | Length | Mask | | | | | |
|---|---|---|---|---|---|---|---|---|---|
| | | | | | FEF | | FCF | | |
| | | | | Class ID | MDID | Indicator | Command code | Data |
| # of bits | 2 | EBV | 8 | 10 | 12 | 1 | 5 | Variable |
| description | 10 | 06h | 14h | 2 | 000000000001 | 1 | 00000 | – |

*EXAMPLE*

FIG. 11C

BROADCAST REFRESH OF RFID TAG PERSISTENCE

CROSS REFERENCE TO RELATED APPLICATIONS

This application claims the benefit of U.S. Provisional Patent Application Ser. No. 61/476,527 filed on Apr. 18, 2011. The disclosures of the provisional patent application are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio-Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag generates the transmitted back RF wave either originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader receives tag data it can learn about the item that hosts the tag and/or about the tag itself.

An RFID tag typically includes an antenna system, a radio section, a power-management section, and frequently a logical section, a memory, or both. In earlier RFID tags the power-management section included an energy storage device such as a battery. RFID tags with an energy storage device are known as battery-assisted, semi-active, or active tags. Advances in semiconductor technology have miniaturized the electronics so much that an RFID tag can be powered solely by the RF signal it receives. Such RFID tags do not include an energy storage device, and are called passive tags. Of course, even passive tags typically include temporary energy- and data/flag-storage elements such as capacitors or inductors.

A goal of many RFID systems is for a reader to inventory all of the tags in a population. Typically, a reader inventories a first tag, instructs the tag not to reply for a period of time (a persistence time), and then proceeds to inventory a second tag. In an ideal world, the reader would continue the process until it has inventoried all of the tags. Unfortunately, if the reader has not finished inventorying all of the tags within the persistence time then the first tag will forget that it has already been inventoried and will allow itself to be inventoried again. Subsequently, the second tag will exhibit the same behavior, followed by later tags. If the tag population is very large then the reader may spend so much time re-inventorying already-inventoried tags that it cannot spend enough time searching for the hard-to-inventory tags. As a result, some of the tags in the population may not be inventoried at all.

One solution is for the tags to have very long persistence times. However, this solution is problematic because if an inventoried tag leaves the field-of-view of a first reader and enters the field-of-view of a second reader before its persistence time has expired, then it will not respond to the second reader until the end of its persistence time, and may actually leave the field-of-view of the second reader before it is inventoried at all. In this two-reader scenario it is therefore desirable for tags to have short persistence times. The conundrum is that in some situations it may be desirable for a tag to have long persistence times, whereas in other situations it may be desirable for tags to have short persistence times. Currently, tags have persistence times that are chosen at the time of manufacture and cannot be changed afterward. These chosen persistence times are at best a compromise and not ideal for many inventory situations.

BRIEF SUMMARY

This summary is provided to introduce a selection of concepts in simplified forms that are further described below in the detailed description. This summary is not intended to identify key features or essential features of the claimed subject matter, nor is it intended as an aid in determining the scope of the claimed subject matter.

Embodiments are directed to RFID readers and reader methods for refreshing the inventoried-flag persistence times of a population of RFID tags. The reader broadcasts a refresh command based on a value of a refresh parameter. The refresh command instructs tags that support the refresh feature to refresh the persistence time(s) of one or more tag inventoried flags. A reader may determine the refresh parameter based on the reader state, an environmental condition, a tag-population parameter, and/or a tag-capability parameter. The reader state may include one or more parameters indicative of a previous value of the refresh parameter, a previous command, a next command, a tag or reader communication rate, and/or an impending frequency hop. The environmental condition may include parameter(s) indicative of RF noise, signal-to-noise ratio(s), and/or temperature. The tag-population parameter may include the number of tags in the tag population, a population-flush parameter, and/or a recurring-tag parameter. The tag-capability parameter may include a flag-persistence parameter and/or a tag-refresh support parameter. By providing the capability for a reader to broadcast a command to a population of tags to refresh their inventoried flags, the flag persistence times can be adjusted to be appropriate for any given inventory situation.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying Drawings, in which:

FIG. 6 is a table showing persistence parameters for RFID tag sessions, according to embodiments;

FIG. 11A is a table illustrating the fields of the Select command of the Gen2 Spec version 1.2.0;

FIG. 11B is a table illustrating how a number of custom commands can be enabled in a reader and a tag using the Select command of FIG. 11A; and FIG. 11C is a table showing example values in the table of FIG. 11B that may cause a tag to implement a broadcast refresh operation.

DETAILED DESCRIPTION

Figure 1:
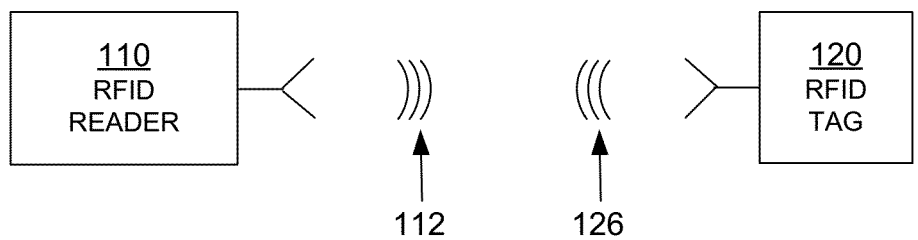
FIG. 1 is a block diagram of components of an RFID system.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed subject matter.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one of current, voltage, charge, temperature, data, or other measurable quantity. The terms "RFID reader" and "RFID tag" are used interchangeably with the terms "reader" and "tag", respectively, throughout the text and claims.

All of the circuits described in this document may be implemented as circuits in the traditional sense, such as with integrated circuits etc. All or some of them can also be implemented equivalently by other ways known in the art, such as by using one or more processors, Digital Signal Processing (DSP), a Floating Point Gate Array (FPGA), etc.

FIG. 1 is a diagram of components of a typical RFID system 100, incorporating embodiments. An RFID reader 110 transmits an interrogating radio frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Data exchange can be performed in a number of ways. Protocols are devised for readers and tags to exchange symbols, also called RFID symbols. A symbol can be a delimiter, a calibration symbol, and so on. Symbols can encode binary data, such as "0" and "1", if that is desired. When symbols are processed by reader 110 and tag 120 they can be considered and treated as numbers having corresponding values, and so on.

RFID tag 120 can be a passive, battery-assisted, or active tag. Where RFID tag 120 is a passive tag, it is powered from wave 112.

Figure 2:
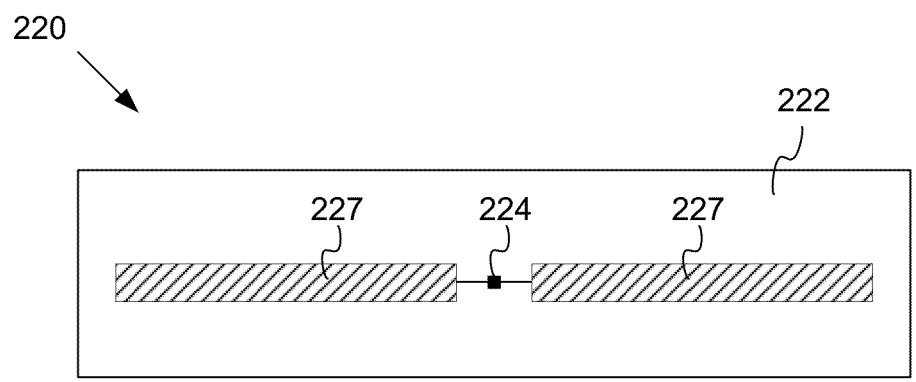
FIG. 2 is a diagram showing components of a passive RFID tag, such as a tag that can be used in the system of FIG. 1.

FIG. 2 is a diagram of an RFID tag 220, which can be the same as RFID tag 120 of FIG. 1. RFID tag 220 is shown as a passive tag. Regardless, much of what is described in this document applies also to battery-assisted, semi-active, and active tags.

RFID tag 220 is formed on a substantially planar inlay 222, which can be made in many ways known in the art. RFID tag 220 includes an electrical circuit 224 which is preferably implemented as an integrated circuit (IC). IC 224 is arranged on inlay 222.

RFID tag 220 also includes an antenna for exchanging wireless signals with the environment. The antenna is often flat and attached to inlay 222. IC 224 is electrically coupled to the antenna via suitable antenna terminals (not shown in FIG. 2).

The antenna may be made in a number of ways. In the example of FIG. 2, the antenna is made from two distinct antenna segments 227, which are shown here forming a dipole. Many other embodiments are possible, using any number of antenna segments. In some embodiments the antenna can comprise a single segment, and different points of the single segment can be coupled to one or more of the antenna terminals of IC 224. For example, the antenna can be a loop, with its ends coupled to the IC terminals. It should be remembered that even a single antenna segment can behave like multiple segments at the frequencies of RFID wireless communication.

In operation, a signal is received by the antenna and communicated to IC 224. IC 224 both harvests power, and responds if appropriate, based on the incoming signal and the IC's internal state. IC 224 may respond by modulating the reflectance of the antenna, which generates backscatter 126 from wave 112 transmitted by the reader. Coupling together and uncoupling the antenna terminals of IC 224 can modulate the antenna's reflectance, as can a variety of other means.

In the embodiment of FIG. 2, antenna segments 227 are separate from IC 224. In other embodiments the antenna segments may be formed on IC 224. Furthermore, an interface element may be used to couple the IC 224 to the antenna segments 227 (not shown in FIG. 2).

The components of the RFID system of FIG. 1 may communicate with each other in any number of modes. One such mode is called full duplex. Another such mode is called half-duplex, and is described below.

Figure 3:
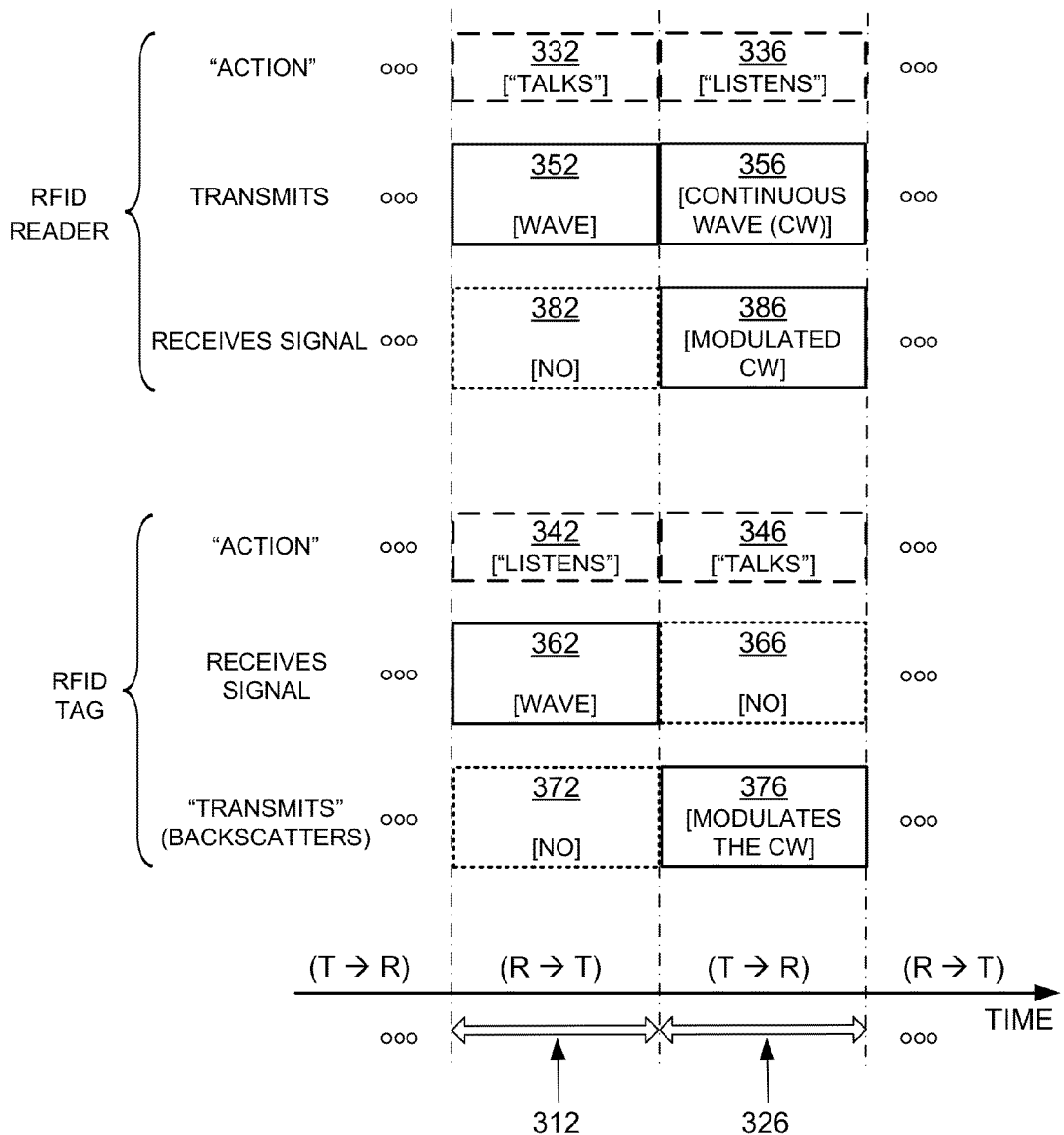
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when RFID reader 110 talks to RFID tag 120 the communication session is designated as "R→T", and when RFID tag 120 talks to RFID reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while RFID reader 110 talks (during interval 312), and talks while RFID reader 110 listens (during interval 326).

In terms of actual technical behavior, during interval 312, RFID reader 110 talks to RFID tag 120 as follows. According to block 352, RFID reader 110 transmits wave 112, which was first described in FIG. 1. At the same time, according to block 362, RFID tag 120 receives wave 112 and processes it, to extract data and so on. Meanwhile, according to block 372, RFID tag 120 does not backscatter with its antenna, and according to block 382, RFID reader 110 has no wave to receive from RFID tag 120.

During interval 326, RFID tag 120 talks to RFID reader 110 as follows. According to block 356, RFID reader 110 transmits a Continuous Wave (CW), which can be thought of as a carrier signal that ideally encodes no information. As discussed before, this carrier signal serves both to be harvested by RFID tag 120 for its own internal power needs, and also as a wave that RFID tag 120 can backscatter. Indeed, during interval 326, according to block 366, RFID tag 120 does not receive a signal for processing. Instead, according to block 376, RFID tag 120 modulates the CW emitted according to block 356, so as to generate backscatter wave 126. Concurrently, according to block 386, RFID reader 110 receives backscatter wave 126 and processes it.

An order, a timing, and other parameters of RFID tag/reader communications may be defined by industry and/or government protocols (also known as standards). For example, the Class-1 Generation-2 UHF RFID Protocol for Communications at 860 MHz-960 MHz ("Gen2 Specification") by EPCglobal, Inc. is one such industry standard. The contents of the Gen2 Specification version 1.2.0 are hereby incorporated by reference.

Figure 4:
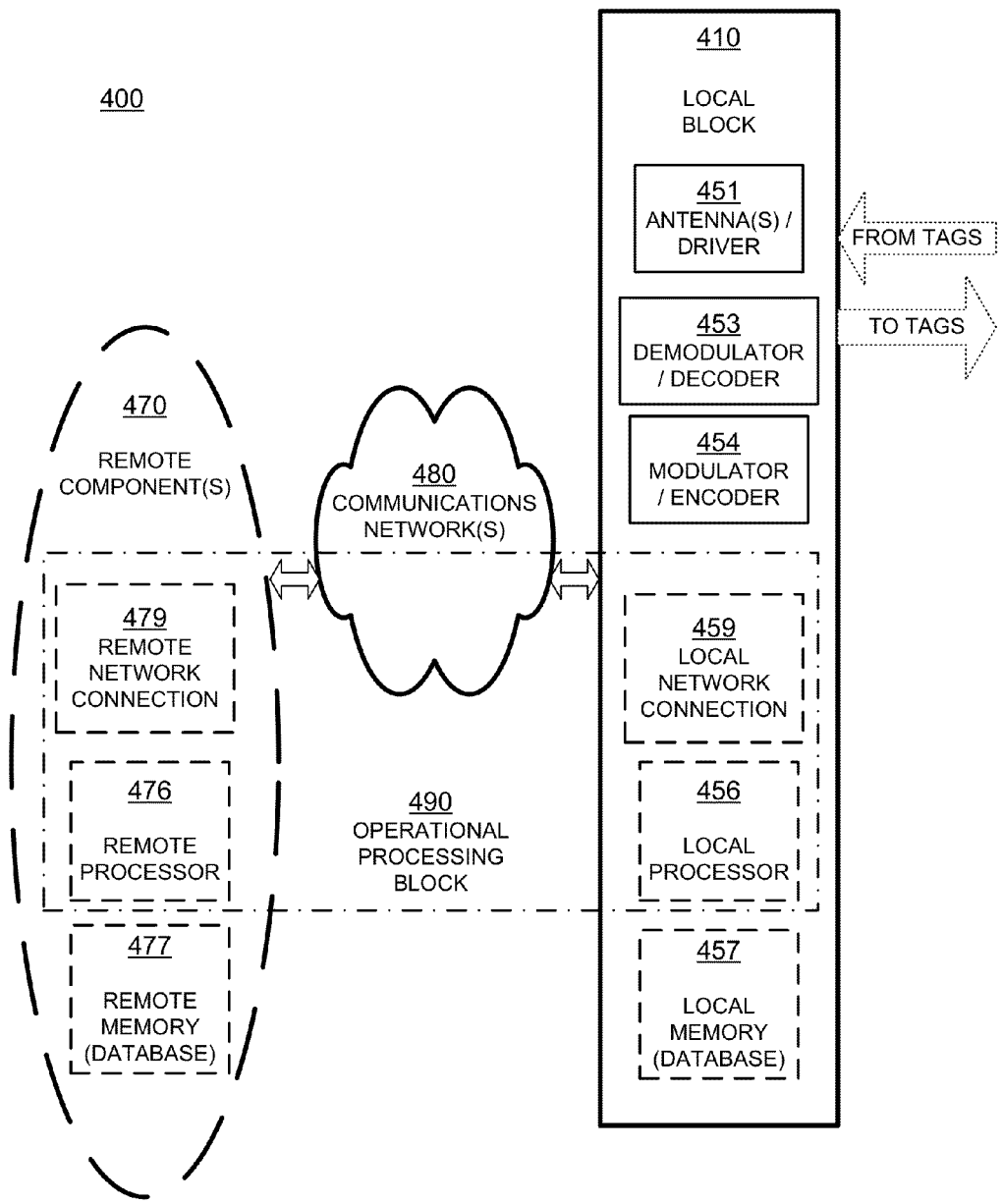
FIG. 4 is a block diagram showing a detail of an RFID reader system, such as the one shown in FIG. 1.

FIG. 4 is a block diagram of an RFID reader system 400 according to embodiments. RFID reader system 400 includes a local block 410, and optionally remote components 470. Local block 410 and remote components 470 can be implemented in any number of ways. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

Local block 410 is responsible for communicating with the tags. Local block 410 includes a block 451 of an antenna and its driver. Some readers, like that shown in local block 410, contain a single antenna and driver. Some readers contain multiple antennas and/or drivers and a method to switch signals among them, including sometimes using different antennas for transmitting and for receiving. And some readers contain multiple antennas and drivers that operate simultaneously. A demodulator/decoder block 453 demodulates and decodes waves received from the tags via antenna/driver block 451. Modulator/encoder block 454 encodes and modulates an RF wave to be transmitted to the tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases local processor 456 may implement an encryption or authorization function; in some cases one or more of these functions can be distributed among other blocks such as encoding block 454, or may be entirely incorporated in another block.

Local block 410 additionally includes an optional local memory 457. Local memory 457 may be implemented in any number of ways known in the art. Such ways include, by way of examples and not of limitation, nonvolatile memories (NVM), read-only memories (ROM), random access memories (RAM), any combination of one or more of these, and so on. These memories can be implemented separately from local processor 456, or in an IC with local processor 456, with or without other components. Local memory 457, if provided, can store programs for local processor 456 to run.

In some embodiments, local memory 457 stores data read from tags, or data to be written to tags, such as Electronic Product Codes (EPCs), Tag Identifiers (TIDs) and other data. Local memory 457 can also include reference data that is to be compared to the EPC or TID codes, instructions and/or rules for how to encode commands for the tags, modes for controlling antenna 451, secret keys, key pairs, and so on. In some of these embodiments, local memory 457 is provided as a database.

Some components of local block 410 typically treat the data as analog, such as the antenna/driver block 451. Other components such as local memory 457 typically treat the data as digital. At some point there is a conversion between analog and digital. Based on where this conversion occurs, a reader may be characterized as "analog" or "digital", but most readers contain a mix of analog and digital functionality.

If remote components 470 are provided, they are coupled to local block 410 via an electronic communications network 480. Network 480 can be a Local Area Network (LAN), a Metropolitan Area Network (MAN), a Wide Area Network (WAN), a network of networks such as the internet, or a mere local communication link, such as a USB, PCI, and so on. In turn, local block 410 then includes a local network connection 459 for communicating with communications network 480. Communications on the network can be secure, such as if they are encrypted or physically protected, or insecure if they are not encrypted or otherwise protected.

There can be one or more remote component(s) 470. If more than one, they can be located at the same location or in different locations. They can communicate with each other and with local block 410 via communications network 480, or via other similar networks, using remote network connection(s) 479. Only one such connection 479 is shown, which is similar to local network connection 459.

Remote component(s) 470 can also include a remote processor 476. Remote processor 476 can be made in any way known in the art, such as was described with reference to local processor 456. Remote processor 476 may also implement an encryption function, similar to local processor 456.

Remote component(s) 470 can also include a remote memory 477. Remote memory 477 can be made in any way known in the art, such as was described with reference to local memory 457. Remote memory 477 may include a local database or a different database of a standards organization, such as one that can reference EPCs. Remote memory 477 may also contain information associated with commands, tag profiles, keys, or the like, similar to local memory 457.

Of the above-described elements, it may be advantageous to consider a combination of these components, designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable, etc. In addition, operational processing block 490 can receive and decode RF waves received via antenna 451, and cause antenna 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing operational processing block 490.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
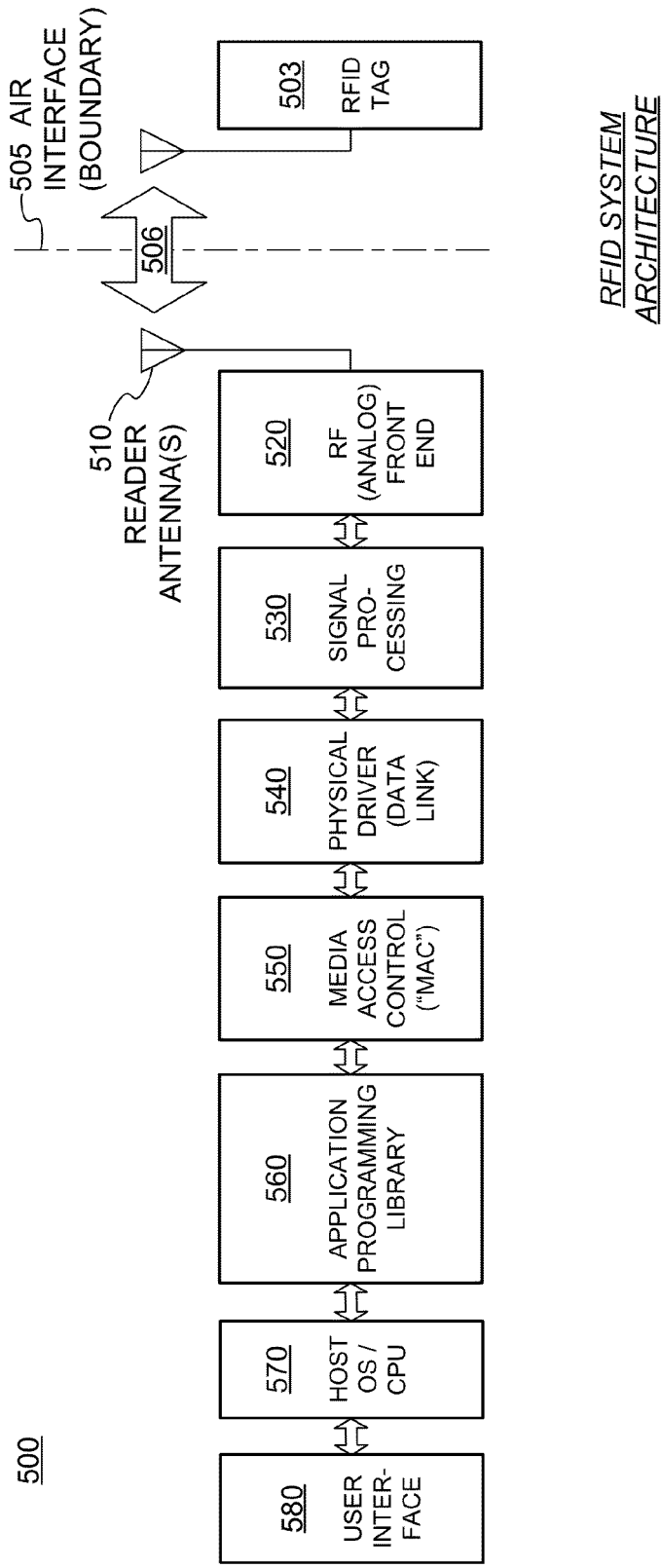
FIG. 5 is a block diagram illustrating an overall architecture of an RFID system according to embodiments.

FIG. 5 is a block diagram illustrating an overall architecture of an RFID reader 500 according to embodiments. It will be appreciated that RFID reader 500 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 503 is considered here as a module by itself. RFID tag 503 conducts a wireless communication 506 with the remainder via air interface 505. It is noteworthy that air interface 505 is really only a boundary, in that signals or data that pass through it are not intended to be transformed from one thing to another. Protocols as to how readers and tags are to communicate with each other, for example the Gen 2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges waveforms with RF front-end module 520, such as I and Q waveform pairs.

RFID system 500 also includes a physical-driver module 540, which is also known as data-link module. In some embodiments physical-driver module 540 exchanges data with signal-processing module 530. Physical-driver module 540 can be the stage associated with the framing of data.

RFID system 500 additionally includes a media access control module 550, which is also known as MAC layer module. In one embodiment, MAC layer module 550 exchanges data packets with physical driver module 540. MAC layer module 550 can make decisions for sharing the medium of wireless communication, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 510 receives wireless waves, which are in turn processed successively by the various modules in the chain. Processing can terminate in any one of the modules. In transmitting mode, waveform initiation can be in any one of the modules. Ultimately, signals are routed to reader antenna(s) 510 to be transmitted as wireless waves.

The architecture of RFID system 500 is presented for purposes of explanation, and not of limitation. Its particular subdivision into modules need not be followed for creating embodiments. Furthermore, the features of the present disclosure can be performed either within a single one of the modules, or by a combination of them.

Embodiments additionally include programs, and methods of operation of the programs. A program is generally defined as a group of steps or operations leading to a desired result, due to the nature of the elements in the steps and their sequence. A program is often implemented as a sequence of steps or operations for a processor. One such program can be to direct a reader to refresh the persistence times of RFID tags.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions of a program made according to the embodiments. A storage medium according to the embodiments is a computer-readable medium, such as a memory, and is read by a processor of the type mentioned above. If a memory, it can be implemented in a number of ways, such as Read Only Memory (ROM), Random Access Memory (RAM), Flash memory, EPROM memory, EEPROM memory, and many others as will be known to those skilled in the art.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

FIG. 6 is a table 600 showing persistence times for RFID tag sessions, according to embodiments. Table 600 is taken from the Gen2 Specification, described above in relation to FIG. 3. The Gen2 Specification requires four tag sessions with corresponding inventoried flags, denoted S0-S3. Each inventoried flag which may have a value of "A" or "B". The Gen2 Specification-required persistence time for the inventoried flags associated with each session is shown in table 600. For example, at a nominal temperature range, the S1 inventoried flag is required to have a persistence time between 500 milliseconds and 5 seconds regardless of whether the tag is energized.

Figure 7:
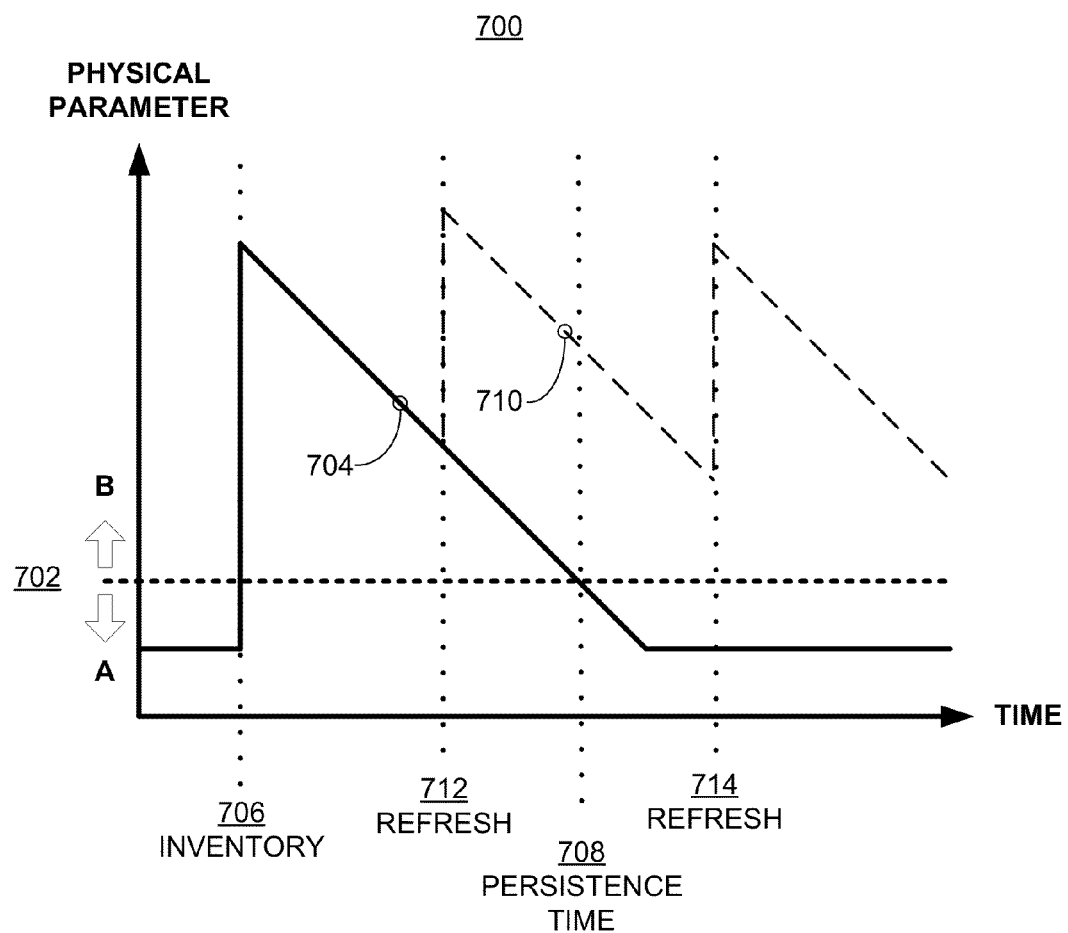
FIG. 7 is a diagram showing the effects of a broadcast refresh on tag flag physical parameters as a function of time, according to embodiments.

FIG. 7 is a diagram 700 showing the effects of a broadcast refresh on a tag-flag physical parameter as a function of time, according to embodiments. A tag-flag physical parameter may include one or more of voltage, current, charge, and flux. In some embodiments, if the value of a flag physical parameter is above a threshold 702 then the flag is considered to hold a first value (for example, the value "B"), whereas if the value of the flag physical parameter is below the threshold 702 then the flag is considered to hold a second value (e.g., the value "A"). When a tag is subject to an inventory operation 706 then the tag-flag physical parameter may be adjusted so as to switch the flag's value. Although the inventory operation 706 in FIG. 7 asserts the tag flag value from "A" to "B", in other embodiments an inventory operation may assert the tag flag value from "B" to "A". The amount by which the tag-flag physical parameter is adjusted by an inventory operation may be static (e.g., it is always increased/decreased by a preset amount) or dynamic (e.g., the amount of increase/decrease varies according to any number of parameters), as long as the adjustment amount is sufficient to change the flag value.

After the inventory operation 706, the tag-flag physical parameter will decay over time, as indicated by curve 704. At some time 708 the tag-flag physical parameter will decay below threshold 702, switching the flag value from B back to A. The difference between time 708 and time 706 is the flag's persistence time, and is how long the flag holds the value B. The rate at which the physical parameter decays may be a function of one or more tag and/or environmental conditions, such as tag design or temperature.

If the tag is capable of executing a broadcast refresh, and a reader broadcasts a refresh command 712 such that the tag receives it before time 708 (and therefore before the physical parameter has decayed below threshold 702), then the refresh command 712 adjusts (or instructs the tag to adjust) the physical parameter to increase the persistence time of the asserted flag value (in the example of FIG. 7 the asserted value is "B"). The term "broadcast" as used in this document implies that the command is directed to a plurality of tags rather than to a singulated tag (where "singulated" is defined as an individual tag singled-out by a reader from among the plurality of tags). As above, the adjustment amount may be static or dynamic, as long as the post-refresh parameter value is different from the parameter value before the refresh command. By broadcasting successive refresh commands (e.g., refresh command 714) the resulting decay curve 710 can be adjusted such that the effective flag persistence time (i.e., the time at which the curve 710 drops below the threshold 702) can be extended as far beyond the normal flag persistence time as desired.

Figure 8:
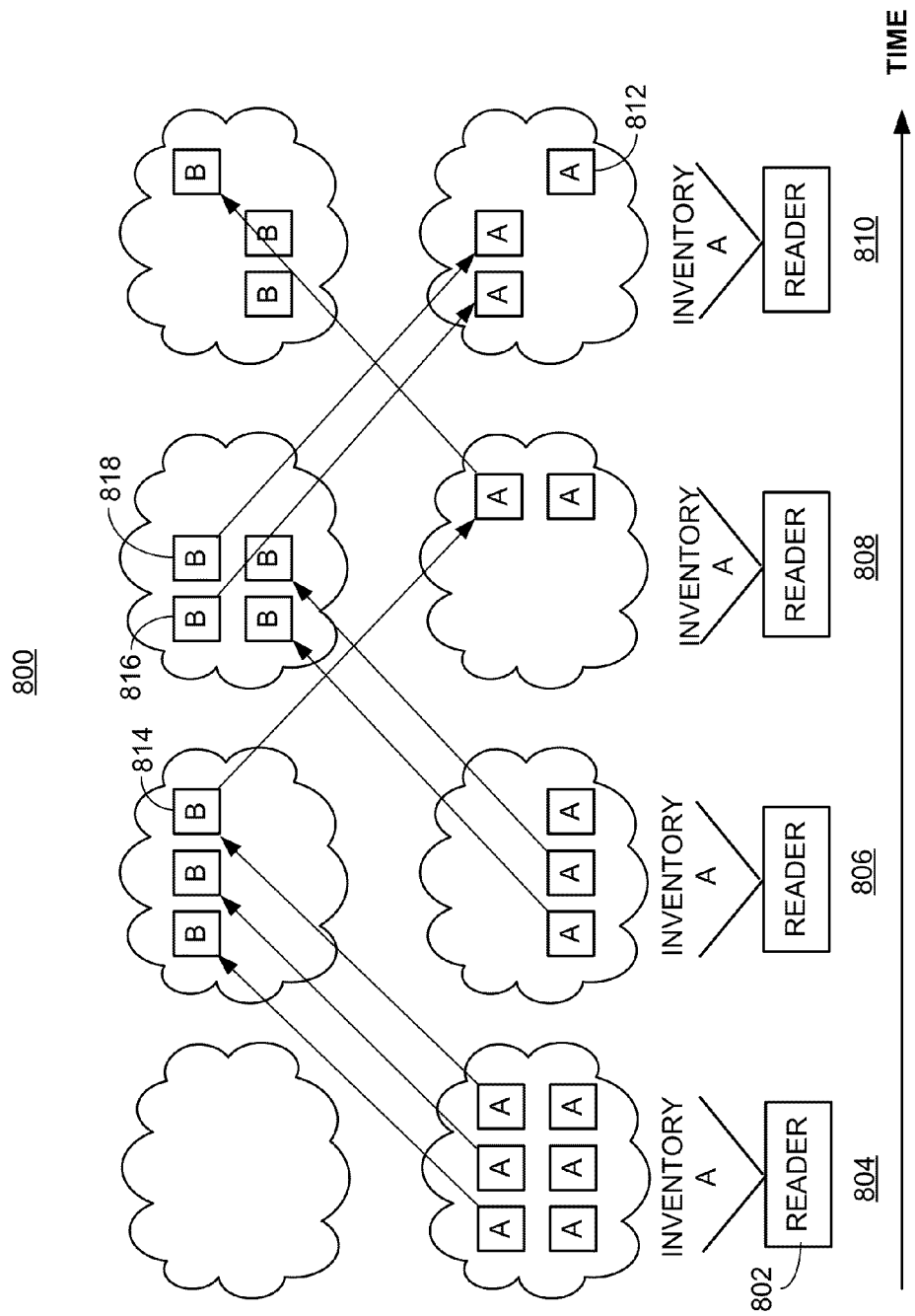
FIG. 8 is a conceptual diagram showing an illustrative inventorying process without broadcast refresh according to embodiments.

FIG. 8 is a conceptual diagram showing an illustrative inventorying process 800 without broadcast refresh according to embodiments. The inventorying process 800 begins at the left and proceeds to the right along the horizontal TIME axis. At time 804, all tags have inventoried flag values of "A" and the reader 802 begins inventorying "A" tags. At time 806, three tags have been inventoried by reader 802 and their inventoried flag values have been switched to "B", but three tags have not yet been inventoried by reader 802 and their flag values remain as "A". After time 806, the reader inventories an additional two tags and switches their flags to "B". However, the flag value of one of the previously-inventoried tags 814, possibly the first tag inventoried, exceeds its persistence time and decays back to "A" after time 806. As a result, at time

808, while five of the six tags have been inventoried, reader 802 still has two tags in the "A" state that it needs to inventory. After time 808, the reader 802 manages to re-inventory tag 814 and switch its flag value back to "B", but in the meantime previously-inventoried tags 816 and 818 have decayed back to "A". Thus, at time 810, although reader 802 has already inventoried five of the six tags, it has not yet inventoried the last tag 812, and it may not be able to devote sufficient time to inventory tag 812 if the previously inventoried tags keep decaying.

Figure 9:
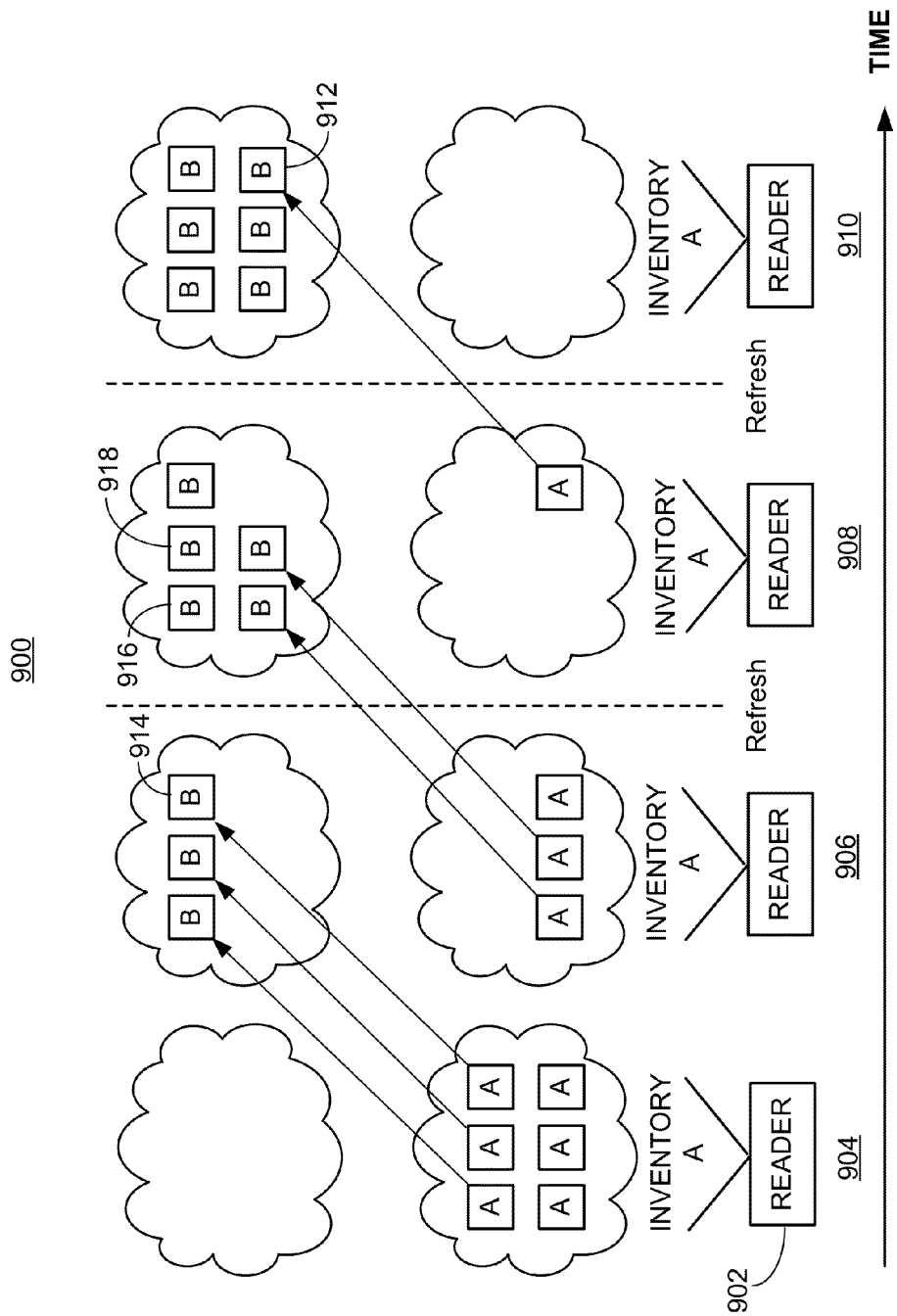
FIG. 9 is a conceptual diagram showing an illustrative inventorying process with broadcast refresh according to embodiments.

FIG. 9 is a conceptual diagram showing an illustrative inventorying process 900 with broadcast refresh according to embodiments. As with inventorying process 800 described above in relation to FIG. 8, the inventorying process 900 begins at time 904 (similar to time 804 in FIG. 8) and proceeds to time 906 with three tags inventoried, similar to time 806 in FIG. 8. Differently from FIG. 8, after time 906 reader 902 broadcasts a refresh command, and tag 914's flag value does not decay back to "A" but instead stays in "B" (differently from tag 814's flag value in FIG. 8, which does decay). As a result, at time 908, five of the six tags have been inventoried, and none have decayed back to the "A" state. At time 908, reader 902 is able to devote sufficient time to inventory the last tag 912, and a broadcast refresh command after time 908 prevents tags 916 and 918 from decaying back to the "A" state at time 910 (compare to tags 816 and 818 in FIG. 8, which do decay back to "A"). Thus, the commanded refresh functionality allows the reader 902 to spend more time searching for and inventorying uninventoried tags instead of inventorying previously inventoried tags.

Figure 10:
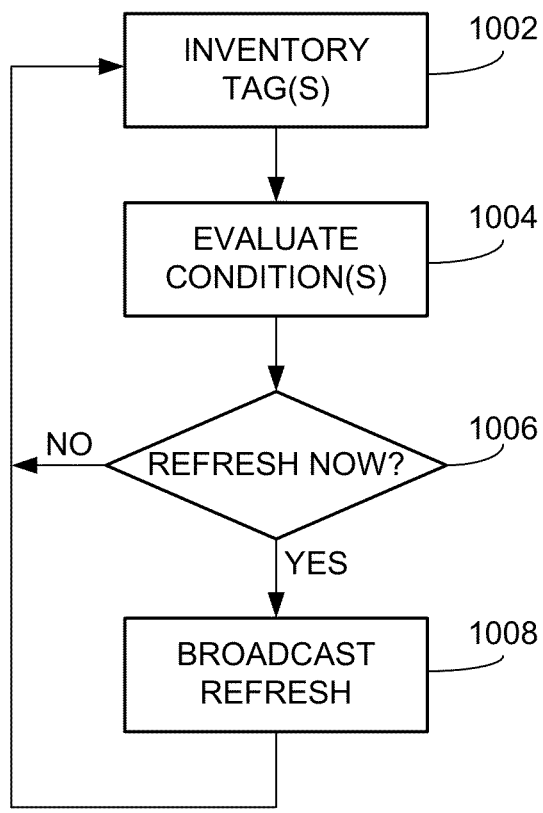
FIG. 10 is a flowchart depicting an illustrative inventorying process with broadcast refresh according to embodiments.

FIG. 10 is a flowchart depicting an illustrative inventorying process 1000 with broadcast refresh according to embodiments. The inventorying process 1000 may be performed by one or more RFID readers, such as RFID reader 110 of FIG. 1. The inventorying process 1000 begins at step 1002, where the RFID reader inventories one or more tags in a tag population. The inventorying process may include the transmission of one or more inventorying commands, which may include a query command, an access command, a read/write command, or any other suitable RFID tag command. After the reader has transmitted one or more inventorying commands, or at certain times, the reader may move to step 1004, where it evaluates one or more refresh conditions. For example, the reader may be configured to move to step 1004 after transmitting a particular number of inventorying commands, or after a particular time interval has passed since the last time it was in step 1004. The number of commands and/or time interval may be static (e.g., preset or otherwise predetermined) or dynamic (e.g., based on real-time determination).

During step 1004, the reader evaluates one or more refresh conditions and then determines and/or updates a refresh parameter based on the refresh condition(s). The refresh parameter determines whether and/or when the reader should broadcast a refresh command and may have a binary value, a time, a flag, or any other suitable indicator. For example, if the refresh parameter is a binary parameter then the binary parameter may indicate whether a refresh command should be immediately broadcast or not. If the refresh parameter is instead (or also includes) a time parameter then the time parameter may indicate the time at which the next refresh command should be broadcast, such as in an absolute format (e.g., at 3:00 PM) or in a relative format (e.g., in 2 seconds).

In some embodiments the refresh conditions may include the reader state. For example, if the reader state indicates that a refresh command was recently broadcast then the refresh parameter may be set or adjusted to delay the next refresh command. Similarly, if the reader state indicates that some time has elapsed since the last refresh command was broadcast then the refresh parameter may be adjusted to reduce the time before the next refresh command is broadcast.

Optionally, the reader state may include a previous-command parameter and/or a next-command parameter, indicating one or more previous commands transmitted by the reader and one or more future commands to be transmitted by the reader, respectively. For example, if the reader had just broadcast a refresh command then the next refresh command may not be needed immediately, and the previous-command parameter may be set or adjusted to cause the refresh parameter to delay the next refresh command. Similarly, if the reader will be transmitting a query command or a tag access command shortly, a refresh command may interfere, and the next-command parameter may be set or adjusted to cause the refresh parameter to delay the next refresh command.

Optionally, the reader state may include a tag or reader communication rate and/or an impending frequency-hop parameter. The communication rate, which may be preset or dynamically set by the reader, determines the number of tags the reader can read in a given time span. If the communication rate is low then the refresh parameter may be set or adjusted to increase the frequency of refresh commands relative to inventorying commands to compensate for the low communication rate. Similarly, if the rate is high, indicating that the reader can communicate with many tags in a given time span, then the refresh parameter may be set or adjusted to decrease the frequency of the refresh commands relative to the inventorying commands. In a similar fashion, the impending frequency-hop parameter indicates whether the reader will change the communications channels/frequencies in the near future. If so, then the refresh parameter may be adjusted to delay the next refresh command until after the frequency hop.

In certain embodiments the refresh conditions may include an environmental condition such as an RF noise parameter, a signal-to-noise ratio parameter, and/or a temperature parameter. For example, if the RF noise parameter indicates that there is a significant amount of RF noise in the environment, or if the signal-to-noise ratio parameter indicates that the signal-to-noise ratio is low, then the refresh parameter may be adjusted to cause the reader to broadcast refresh commands more often, to account for the increased likelihood of noise interfering with the refresh command. Similarly, if the temperature parameter indicates that the temperature is high, which decreases tag-flag persistence times, then the refresh parameter may be adjusted to cause the reader to broadcast refresh commands more often to account for the lower flag persistence times.

The refresh conditions may include a tag-population parameter approximating the number of tags in the tag population, a recurring-tag parameter, and/or a population-flush parameter. If there are many tags in the population then the tag-population parameter may be adjusted to cause the reader to broadcast refresh commands more often, to give the reader the maximum opportunity to inventory not-inventoried tags, and vice-versa. Similarly, if a recurring-tag parameter indicates that certain tags are recurring in the inventorying process more often than desired (which may indicate faster-than-expected flag decay) then the recurring-tag parameter may be adjusted to cause the reader to broadcast refresh commands more often.

In some situations, it may be desirable to clear or deassert the inventoried flags of all tags in the population. In these situations, a population-flush parameter may be set to cause the reader to delay the transmission of refresh commands beyond the flag persistence time such that all tag flags have the opportunity to decay.

In some embodiments the refresh conditions may include one or more tag-capability parameters indicating the capabilities of tags in the current tag population. For example, a tag-capability parameter may be a flag-persistence parameter indicating the persistence time of tag flags in the current tag population. If the flag-persistence parameter indicates that tag flags have relatively long persistence times then the refresh parameter may be adjusted to increase the time interval between successive broadcast refresh commands. If, on the other hand, the flag-persistence parameter indicates that the tag flags have relatively short persistence times then the refresh parameter may be adjusted to decrease the time interval between successive broadcast refresh commands.

As another example, a tag-capability parameter may include a tag-refresh support parameter indicating whether tags in the current population are capable of implementing the commanded refresh functionality. If none or few of the tags in the current population have a refresh capability then the refresh parameter may be adjusted to cause the reader to disable broadcasting refresh commands until tags that have the commanded refresh capability enter the tag population.

After the reader has evaluated the refresh conditions in step 1004, it proceeds to step 1006 where it decides if a refresh command should be broadcast based on the refresh conditions and refresh parameter determined in step 1004. If the decision is affirmative then the reader proceeds to step 1008, where it broadcasts a refresh command. Subsequently, or if it decided that a refresh command should not be broadcast at step 1006, the reader proceeds to step 1002 where it continues the inventorying process.

The above-mentioned refresh command can be constructed to be distinct from or in accordance with the communications protocol. A refresh command that is distinct from the communications protocol may be a custom or a proprietary command. A refresh command that is in accordance with the communications protocol may be a protocol command itself, or may co-opt a protocol command with a modified payload configured to instruct the tags to implement the refresh operation. In any case, a refresh command may optionally transfer a refresh value (such as a refresh persistence time) to the tags. As one example of a refresh command in accordance with a protocol, the refresh command can be a Select command of the Gen2 Specification, and the payload section can be a mask field within the Select. The Select command has the benefit that the Gen2 Specification specifies that it can be broadcast to a population of tags simultaneously. The following not-limiting example specifies one way (among the many possible) to use the Select command to specify a refresh operation.

FIG. 11A is a table illustrating the fields of the Select command according to Gen2 V1.2.0. The fields of this Select command are explained in the Gen2 Specification. FIGS. 11B and 11C show how to configure these fields so that a tag may interpret the Select command as instructing it to perform a refresh operation.

FIG. 11B illustrates how a Select command can instruct a tag to perform different operations, one of which can be a refresh operation. In this example the Mask Field of FIG. 11A is partitioned into two subfields, a Feature Enabling Field (FEF) and a Feature Command Field (FCF). The FEF enables a tag to determine, by comparing the FEF value against a value in the memory bank specified by Membank, that it should perform the operation. The FEF may be further partitioned into subfields. The FCF has a command code that indicates the specific operation and data for the operation, and likewise may be partitioned into subfields. In FIG. 11B, a 5-bit command code can specify 32 operations. In some embodiments a 11111 command code can specify that the command code is in the data field, allowing more than 32 operations.

FIG. 11C illustrates an example of using the fields of FIG. 11B for a refresh operation. In this example the FEF is partitioned into subfields which include a Class Identifier, an MDID, and an Indicator Bit. The Class Identifier is two bits which allow the command to specify a tag class, such as tags built according to EPCglobal specifications. The MDID is a tag manufacturer's ID such as 000000000001 or 100000000001, which specify a tag IC manufactured by Impinj, Inc, of Seattle, Wash. The Indicator Bit instructs the tag to interpret the command either as an "ordinary" Select and to execute it per the Gen2 Specification, or as a custom operation and to execute it according to the FCF. Also in this example the FCF is partitioned into subfields which include a Command Code which specifies the operation and Data which contains data for the operation.

For the embodiment of FIG. 11C, which is one of many possible embodiments, Membank=$10_2$ specifies TID memory, Pointer=$06_h$ points to the last two bits of the Class Identifier, Length=$14_h$ indicates that 20 bits follow, ClassID=$10_2$ selects EPCglobal tags, MDID=$000000000001_2$ specifies Impinj, Indicator=$1_2$ specifies a custom operation, Command Code=$00000_2$ specifies a refresh operation, and no Data follow the Command Code because, in this embodiment, the refresh command does not need any data. Other commands may use the Data field, and its formatting will depend on the command code. In this embodiment the tag ignores the Target and Action field in the Select command; in other embodiments, the tag may use these fields.

In certain embodiments, a Select command that encapsulates an operation such as a refresh may apply the operation to only a subpopulation of tags. For example, the Select may select tags that are in motion or not in motion, tags that are locked or not locked, tags that have a particular bit sequence in a memory location, tags that have a certain power level, tags with any particular feature or characteristic, or any other criteria. In these situations, the refresh operation encapsulated within the Select command may be executed by those tags meeting the selected feature, characteristic, or criteria; or by tags not meeting the selected feature, characteristic, or criteria; or a mix thereof.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

I claim:

1. An RFID reader configured to communicate with a plurality of RFID tags, the reader comprising:
   a transceiver; and
   a processor block coupled to the transceiver, the processor block configured to:
      transmit a broadcast command including an indicator field, a first command code, and a mask field, wherein:
         a first value for the indicator instructs the plurality of RFID tags to execute an operation specified by the first command code and the mask field; and a second value for the indicator instructs the plurality of RFID tags to ignore the first command code, interpret at least a portion of the mask field as a second command code, and perform a second operation specified by the second command code, wherein:
  if the second command code specifies a refresh operation, then the plurality of RFID tags are instructed to perform the refresh operation; and
  if the second command code specifies another operation, then the plurality of RFID tags are instructed to perform the other operation using a data field, the data field included in the broadcast command and associated with the second command code.

2. The reader of claim 1, wherein the processor block is configured to transmit the broadcast command based on at least one of a previous refresh parameter, a previous-command parameter, a next-command parameter, a communication-rate parameter, and an impending frequency-hop parameter.

3. The reader of claim 1, wherein the processor block is configured to transmit the broadcast command based on at least one of an RF noise parameter, a signal-to-noise ratio parameter, and a temperature parameter.

4. The reader of claim 1, wherein the processor block is configured to transmit the broadcast command based on at least one of a number of tags in a tag population, a population-flush parameter, and a recurring-tag parameter.

5. The reader of claim 1, wherein the processor block is configured to transmit the broadcast command based on at least one of a flag-persistence parameter and a tag-refresh support parameter.

6. The reader of claim 1, wherein the broadcast command is a "Select" command according to the Gen2 Specification.

7. The reader of claim 1, wherein the first command code specifies a command operable to select a subpopulation of the plurality of RFID tags.

8. The reader of claim 1, wherein the refresh operation causes the plurality of RFID tags to refresh their respective one or more inventoried flags.

9. The reader of claim 1, wherein the refresh operation is configured to adjust a flag stored charge.

10. A method for an RFID reader to communicate with a plurality of RFID tags, comprising:
  determining a refresh parameter based on at least one of a reader state, an environmental condition, a tag-population parameter, and a tag-capability parameter; and
  transmitting a broadcast command based on the refresh parameter and including an indicator field, a first command code, and a mask field, wherein
    a first value for the indicator instructs the plurality of RFID tags to execute an operation specified by the first command code and the mask field; and
    a second value for the indicator instructs the plurality of RFID tags to ignore the first command code, interpret at least a portion of the mask field as a second command code, and perform a second operation specified by the second command code, wherein:
      if the second command code specifies a refresh operation, then the plurality of RFID tags are instructed to perform the refresh operation; and
      if the second command code specifies another operation, then the plurality of RFID tags are instructed to perform the other operation using a data field, the data field included in the broadcast command and associated with the second command code.

11. The method of claim 10, wherein the reader state includes at least one of a previous value of the refresh parameter, a previous-command parameter, a next-command parameter, a communication-rate parameter, and an impending frequency-hop parameter.

12. The method of claim 10, wherein the environmental condition includes at least one of an RF noise parameter, a signal-to-noise ratio parameter, and a temperature parameter.

13. The method of claim 10, wherein the tag-population parameter includes at least one of a number of tags in a tag population, a population-flush parameter, and a recurring-tag parameter.

14. The method of claim 10, wherein the tag-capability parameter includes at least one of a flag-persistence parameter and a tag-refresh support parameter.

15. The method of claim 10, wherein the broadcast command is a "Select" command according to the Gen2 Specification.

16. The method of claim 10, wherein the first command code specifies a command operable to select a subpopulation of the plurality of RFID tags.

17. The method of claim 10, wherein the refresh operation causes the plurality of RFID tags to refresh their respective one or more inventoried flags.

18. The method of claim 10, wherein the refresh operation adjusts a flag stored charge.

19. A method for an RFID reader to communicate with a plurality of RFID tags, comprising:
  determining a subpopulation of the plurality of RFID tags to execute a refresh operation; and
  transmitting a broadcast command specifying the subpopulation of tags and including an indicator fi d, a first command code, and a mask field, wherein:
    a first value for the indicator instructs the plurality of RFID tags to execute an operation specified by the first command code and the mask field; and
    a second value for the indicator instructs the plurality of RFID tags to ignore the first command code, interpret at least a portion of the mask field as a second command code, and perform a second operation specified by the second command code, wherein:
      if the second command code specifies a refresh operation, then the plurality of RFID tags are instructed to perform the refresh operation; and
      if the second command code specifies another operation, then the plurality of RFID tags are instructed to perform the other operation using a data field, the data field included in the broadcast command and associated with the second command code.

20. The method of claim 19, further comprising:
  transmitting the broadcast command based on at least one of a previous refresh parameter, a previous-command parameter, a next-command parameter, a communication-rate parameter, and an impending frequency-hop parameter.

* * * * *